United States Patent
Slabbinck et al.

(10) Patent No.: US 7,782,837 B2
(45) Date of Patent: Aug. 24, 2010

(54) SPECTRAL COMPATIBLE REMOTE ASYMMETRIC DIGITAL SUBSCRIBER LINE PLUS (ADSL+) DEPLOYMENT

(75) Inventors: Hans Slabbinck, Destelbergen (BE); Ronald Heron, Antwerpen (BE)

(73) Assignee: Alcatel, Paris (FR)

(*) Notice: Subject to any disclaimer, the term of this patent is extended or adjusted under 35 U.S.C. 154(b) by 2118 days.

(21) Appl. No.: 10/455,432

(22) Filed: Jun. 6, 2003

(65) Prior Publication Data
US 2003/0227938 A1 Dec. 11, 2003

(30) Foreign Application Priority Data
Jun. 7, 2002 (EP) .................... 02291424

(51) Int. Cl.
*H04L 12/66* (2006.01)
*H04J 1/00* (2006.01)
(52) U.S. Cl. .............. 370/352; 370/465; 370/480
(58) Field of Classification Search ........... 370/252, 370/494, 495, 385, 488
See application file for complete search history.

(56) References Cited

U.S. PATENT DOCUMENTS

| | | | |
|---|---|---|---|
| 6,741,604 B1* | 5/2004 | Rippin et al. ............ 370/431 |
| 7,092,394 B2* | 8/2006 | Czerwiec et al. ......... 370/395.1 |
| 7,103,004 B2* | 9/2006 | Wang ...................... 370/252 |
| 2002/0075952 A1* | 6/2002 | Verbin et al. ............ 375/231 |
| 2003/0086487 A1* | 5/2003 | Kumar .................... 375/222 |
| 2003/0198217 A1* | 10/2003 | Redfern .................. 370/352 |

FOREIGN PATENT DOCUMENTS

WO  WO 9735399  9/1997

OTHER PUBLICATIONS

Jacobsen, Krista S. and Redfern, Arthur, "Introduction to ADSL+", Apr. 22-26, 2002, Texas Instruments, TM6, pp. 1, 6-7.*
J. Gioffi et al, "Example Improvements of Dynamic Spectrum Management" T1E1.4, Feb. 19, 001 XP002224058.
Peter LeBlanc, "New ADSL Standards Enable Chipsets to Deliver Multiple Channels of Video—Session T-154", Supercomm 2002, Jun. 6, 2002, XP002224059.
Krista S. Jacobsen et al, "Introduction of ADSL+", ETSI Standard Subcommittee TM6, Reference TM60222t25, France, Apr. 22-26, 2002.
Nov. 2003 DSL Forum Talk in Paris (enclosed).
T1E1.4 Contribution 2003-325 dated Dec. 8-12, 2003.
T. Starr et al, DSL Advances, Prentice-Hall (2003 Edition).
George Ginis et al, "Vectored Transmission for Digital Subscriber Line Systems", IEEE JSAC special issue on twisted-pair transmission, vol. 20, Issue 5, pp. 1085-1104, Jun. 2002.

(Continued)

*Primary Examiner*—Chirag G Shah
*Assistant Examiner*—Suk Jin Kang
(74) *Attorney, Agent, or Firm*—Sughrue Mion, PLLC

(57) ABSTRACT

For ADSL+ deployment between a remote cabinet and customer premises, the upper part of the traditional ADSL downstream frequency band is used whereas the lower part of this trasitional ADSL downstream frequency band is switched off through spectral masking. This way, ADSL+ deployment from the remote cabinet is spectral compatible with ADSL deployment from the central office for a certain service capability wherein the upper part of the traditional ADSL downstream frequency band is switched off.

5 Claims, 1 Drawing Sheet

OTHER PUBLICATIONS

J. M. Cioffi, Chapter 4 "Generalized Decision-Feedback Equalization for Packet Transmission with ISI and Gaussian Noise" from *Communications, Control of Signal Processing: A Tribute to Thomas Kailath* (A. Paulraj et al, Ed.), Kluwer Academic Publishers, 1997.

T1E1.4 contribution 2002-069—Feb. 18, 2002.

T1E1.4 contribution 1992-203—Dec. 1, 1992.

A. Weissberger et al, "ADSL-DMT Out of Service Tests, Simplified Start-up Procedure(s), and Layer Management Protocols," Standards Project: ADSL Testing and Management, Brussels, Belgium; Sep. 16-17, 1997 (enclosed).

* cited by examiner

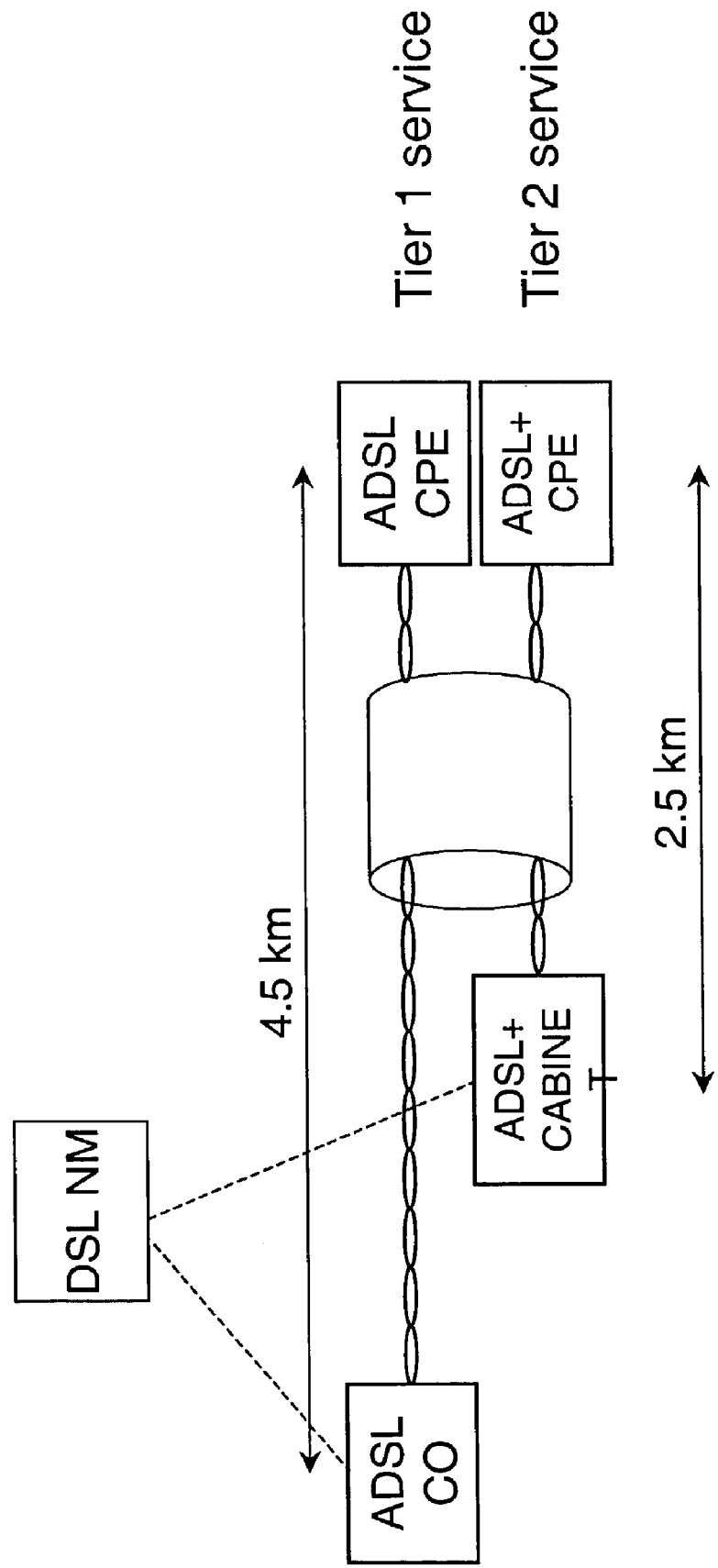

SPECTRAL COMPATIBLE REMOTE ASYMMETRIC DIGITAL SUBSCRIBER LINE PLUS (ADSL+) DEPLOYMENT

BACKGROUND OF THE INVENTION

1. Field of the Invention

The present invention relates to deployment of the Asymmetric Digital Subscriber Line Plus (ADSL+) service which is a technology for asymmetric bi-directional data transfer over twisted pair copper wires similar to the Asymmetric Digital Subscriber Line (ADSL) service but which uses an extended downstream bandwidth in order to achieve higher downstream bit rates.

2. Description of the Related Art

Such an ADSL+ service is already known from the Contribution to the ETSI Standards Subcommittee TM6 entitled "*Introduction of ADSL+*". This ETSI Contribution was authored by Krista S. Jacobsen and Arthur Redfern from Texas Instruments and has the reference TM6 022t25. In this publication, ADSL+ is presented as solution to provide higher downstream bit rates on short loops and compared to Very High Speed Digital Subscriber Line (VDSL) service. By using the frequency spectrum between 1104 kHz and 2208 kHz and doubling the number of carriers compared to traditional ADSL, downstream bit rates above 10 Mbps can be achieved with ADSL+ on loops between 1.5 km and 2.7 km in length. Depending on the loop noise, even higher bit rates in the order of 20 Mbps are achievable for loops up to 1.8 km. On longer loops however, the extra carriers in the higher frequency spectrum between 1104 kHz and 2208 kHz are too attenuated as a consequence of which ADSL+ service automatically reverts to traditional ADSL service.

Compared to VDSL, ADSL+ has the benefit that it can be deployed using the same hardware platform as ADSL: identical power requirements, comparable line driver and digital module. As a result, ADSL+ offers a cost attractive possibility to operators to upgrade their not yet depreciated ADSL infrastructure in order to be able to provide higher downstream bitrates for applications such as video streaming, and audio/video/software downloads.

To maximize the customer base that can benefit from the high downstream bit rate, ADSL+ can be deployed from remote cabinets, located closer to the customer premises (within 2.5 km from the customer) than the central office (typically up to 4.5 km distance from the customer) for downstream bit rates of 1 Mbps. However, since ADSL+ deployed from a remote cabinet is not spectrally compatible for a certain service capability with ADSL deployed from the central office (certain areas which are reachable from the central office for the low bit rate ADSL service, are not reachable for a high bit rate ADSL+ service from the central office as a result of which ADSL+ has to be deployed from a cabinet in the field), high level crosstalk effects between wires in the same bundle can drastically degrade the achievable downstream bit rates for the ADSL service deployed from the central office. An obvious solution to this problem proposed in the above mentioned ETSI Contribution is Power Spectral Density (PSD) shaping: rather than allowing ADSL+ to transmit at the maximum PSD, the transmit PSD is reduced for carriers below 1104 kHz. A drawback of spectral shaping below 1104 kHz is that part of the downstream bit rate of both the ADSL+ and ADSL services is sacrificed. Furthermore, the required PSD reduction will depend on various parameters such as the difference in loop lengths used for ADSL and ADSL+, the noise on the loop, distance between the ADSL central office and ADSL+ remote cabinet, etc., and optimal PSD reduction (i.e. maximizing the downstream achievable bit rates for the ADSL and ADSL+ services) will be frequency dependent. Therefore, PSD shaping will increase the operational and implementational complexity of ADSL and ADSL+ equipment significantly. Making the PSD shaping dependent in the distance between the central office and the cabinet represents a significant operational burden to an operator, rendering the solution known from the ETSI contribution unattractive.

SUMMARY OF THE INVENTION

An object of the present invention is to provide technology for deploying a service from a remote cabinet using ADSL+ that is spectrally compatible with a service deployed from a central office using ADSL but which does not require a PSD shaper.

Indeed, by applying spectral masking to switch off for ADSL+ the carriers in the lower part of the regular ADSL downstream band, e.g. the carriers below 450 kHz, possible cross talk effects are mitigated without complex PSD shaping. Such spectral masking or switching off carriers can be pre-programmed in the DSL equipment or can be instructed by the DSL network management platform which simplifies required operational and implementational changes.

In addition, for the first tier ADSL service deployed from the central office, the carriers in the upper part of the regular ADSL downstream band, e.g. the carriers above 450 kHz, can be switched off through spectral masking at the central office. Alternatively, the ADSL service can be deployed unchanged from the central office, no bit loading can be applied above 450 kHz, or the well known bit swap algorithm can be used to further suppress crosstalk in the upper part of the downstream ADSL frequency band that will be used by the ADSL+ service from the cabinet.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

An optional feature of the method to deploy ADSL+ according to the present invention is defined by claim 2.

This particular choice of the lower part and upper part starts from the observation that for a 1 Mbps service upto 4.5 km not the full ADSL downstream spectrum upto 1104 kHz is needed but only the spectrum below 450 to 500 kHz. As a result, ADSL+ which is deployed from a remote cabinet can use the spectrum from e.g. 500 kHz upwards. Obviously, the present invention is not limited to any particular choice for the lower part and upper part, since such choice depends on the bit rates the operator desires to achieve in the first tier ADSL and second tier ADSL+ services.

BRIEF DESCRIPTION OF THE DRAWINGS

The above mentioned and other objects and features of the invention will become more apparent and the invention itself will be best understood by referring to the following description of an embodiment taken in conjunction with the accompanying drawing FIGURE which represents an access network wherein ADSL and ADSL+ services are deployed according to the present invention.

DETAILED DESCRIPTION OF EXEMPLARY EMBODIMENTS

In the network drawn in the FIGURE, a first tier ADSL service (low bit rate) is deployed from a central office ADSL CO serving customer premises ADSL CPE located up to 4.5 km away from the central office ADSL CO. In addition, a second tier ADSL+ service (high bit rate) is deployed from a a cabinet in the field ADSL+ CABINET serving customer premises ADSL+ CPE located up to 2.5 km away from the cabinet ADSL+ CABINET. The latter remote ADSL+ service complements the central office ADSL coverage with the possibility to offer customers increased downstream bit rates over their twisted pair copper telephone wires. Both central office ADSL service and the cabinet ADSL+ service exist in the same cable bundle. A network management platform DSL NM manages the DSL nodes like the central office ADSL CO and the cabinet ADSL+ CABINET in the drawn access network.

Upon instruction of the network manager DSL NM, the central office ADSL CO has switched off all downstream carriers (or subbands) above 500 kHz. This is done through spectral masking up to 500 kHz. As a result, the ADSL+ service that is deployed from the cabinet can use the spectrum from 500 kHz up to 2208 kHz. The network manager DSL NM thereto informs the cabinet ADSL+ CABINET that only the downstream carriers below 500 kHz have to be switched off for the ADSL+ service provision, whereas all carriers above 500 KhZ can be used. Again, spectral masking is used by the cabinet ADSL+ CABINET to switch off the appropriate carriers. As a result, the loop reach and achievable bit rates will be much better than for an ADSL+ flavour that uses only the spectrum above 1104 kHz. Cross talk effects between the tier 1 ADSL service and tier 2 ADSL+ service are prevented because there is no overlap in the spectrum used for these services anymore.

By using the upper part of the downstream ADSL spectrum, the loop reach for ADSL+ deployment from the cabinet increases. This is so because the spectrum above 1104 kHz is a low quality spectrum with high attenuation. As a result a smaller number of cabinets is needed in the field for full coverage and the required capital expenditure decreases.

It is remarked that in addition to the first tier ADSL service, also an ADSL+ service can be deployed from the central office ADSL CO to offer higher downstream bandwidth to customers physically located within the vicinity of the central office ADSL CO. Such an ADSL+ service deployed from the central office ADSL CO is spectrally compatible with the first tier ADSL service deployed from the central office ADSL CO, so no adaptations are required to mitigate eventual crosstalk between the ADSL and ADSL+ services deployed from the central office ADSL CO.

Thus, the present invention is also advantageous from a local loop unbundling and regulatory point of view, because CLECs are no longer blocked to deploy ADSL+ services from the cabinet by the already existing ADSL deployment from the central office.

Another remark is that the choice of the boundary between the carriers used for central office ADSL service and those for cabinet ADSL+ service at 500 kHz in the above described sample implementation of the present invention is rather arbitrary. In a preferred embodiment of the invention, this boundary is chosen somewhere between 450 kHz and 500 kHz since the spectrum below 450 to 500 kHz will still be sufficient for a 1 Mbps central office ADSL service, whereas the loop reach and achievable downstream bit rates will increase significantly for the ADSL+ service deployed from the cabinet in comparison to an ADSL+ service that only uses the spectrum above 1104 kHz. Also this boundary can be superimposed on the nodes by a network manager as is the case in the above embodiment of the invention, but alternatively might be pre-programmed in the nodes and customer premises terminals.

Furthermore, it is noticed that although spectral masking is applied at the central office in the above described embodiment of the invention to switch off the carriers in the upper part of the ADSL downstream frequency band, in an alternative embodiment of the invention ADSL would be deployed unchanged from the central office (so without spectral masking), or the bit swap algorithm could be used to reduce crosstalk in the upper part of the downstream ADSL frequency band.

While the principles of the invention have been described above in connection with specific apparatus, it is to be clearly understood that this description is made only by way of example and not as a limitation on the scope of the claims.

The invention claimed is:

1. A method to deploy an Asymmetric Digital Subscriber Line Plus (ADSL+) service between a remote cabinet and at least one customer premises terminal, wherein for downstream data transfer a higher frequency spectrum than the traditional Asymmetric Digital Subscriber Line (ADSL) downstream frequency spectrum is used, the method comprising:

switching off a lower part of a traditional ADSL downstream frequency spectrum through spectral masking for downstream data transfer of the ADSL+ service;

wherein for said downstream data transfer of said ADSL+ service, an upper part of said traditional ADSL downstream frequency spectrum is also used.

2. The method to deploy ADSL+ according to claim 1, wherein said upper part of said traditional ADSL downstream frequency spectrum corresponds to a frequency spectrum from a first frequency between 450 kHz and 500 kHz up to a second frequency being 1104 kHz.

3. A remote Digital Subscriber Line cabinet configured to provide to at least one customer an Asymmetric Digital Subscriber Line Plus (ADSL+) service wherein for downstream data transfer a higher frequency spectrum than a traditional Asymmetric Digital Subscriber Line (ADSL) downstream frequency spectrum is used, said remote Digital Subscriber Line cabinet comprising spectral masking means for switching off a lower part of the traditional ADSL downstream frequency spectrum for said ADSL+ service, wherein said Digital Subscriber Line cabinet is further configured to use for said downstream data transfer also an upper part of said traditional ADSL downstream frequency spectrum.

4. A Digital Subscriber Line central office able to provide to at least one customer an Asymmetric Digital Subscriber Line (ADSL) service, wherein said Digital Subscriber Line central office comprises spectral masking means for switching off an upper part of the traditional ADSL downstream frequency spectrum for said ADSL service.

5. A Digital Subscriber Line management hardware platform managing a number of Digital Subscriber Line nodes in a network comprising at least one Digital Subscriber Line central office able to provide an Asymmetric Digital Subscriber Line (ADSL) service, and at least one remote Digital Subscriber Line cabinet able to provide an Asymmetric Digital Subscriber Line Plus (ADSL+) service, wherein said Digital Subscriber Line management hardware platform is configured to instruct said Digital Subscriber Line cabinet to switch off a lower part of a traditional ADSL downstream frequency spectrum through spectral masking for providing said ADSL+ service.

* * * * *